United States Patent
Nakajima et al.

(10) Patent No.: US 8,803,974 B2
(45) Date of Patent: Aug. 12, 2014

(54) HORSE BODY INFORMATION PROVISION SYSTEM, HORSE BODY STILL IMAGE DATA EXTRACTION METHOD, HORSE BODY STILL IMAGE DATA EXTRACTION PROGRAM AND COMPUTER-READABLE RECORDING MEDIUM

(75) Inventors: Yoshiaki Nakajima, Shinagawa-ku (JP); Shinichi Shimoyama, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 362 days.

(21) Appl. No.: 13/265,410

(22) PCT Filed: Nov. 30, 2010

(86) PCT No.: PCT/JP2010/071356
§ 371 (c)(1),
(2), (4) Date: Oct. 20, 2011

(87) PCT Pub. No.: WO2011/065563
PCT Pub. Date: Jun. 3, 2011

(65) Prior Publication Data
US 2012/0062750 A1    Mar. 15, 2012

(30) Foreign Application Priority Data
Nov. 30, 2009    (JP) ................. 2009-272149

(51) Int. Cl.
*H04N 7/18*    (2006.01)
(52) U.S. Cl.
USPC ....................................................... 348/157

(58) Field of Classification Search
USPC ........................................................... 348/157
See application file for complete search history.

(56) References Cited

U.S. PATENT DOCUMENTS

| | | | |
|---|---|---|---|
| 2007/0118239 A1 | 5/2007 | Zimmermann et al. | |
| 2008/0139264 A1 | 6/2008 | He et al. | |
| 2009/0042628 A1* | 2/2009 | Yoda ................................. | 463/6 |
| 2009/0149233 A1 | 6/2009 | Strause et al. | |

FOREIGN PATENT DOCUMENTS

| | | |
|---|---|---|
| EP | 0 083 848 A1 | 7/1983 |
| JP | 58-162222 A | 9/1983 |
| JP | 10-040321 A | 2/1998 |
| JP | 2002-140454 A | 5/2002 |
| JP | 2002-346012 A | 12/2002 |
| JP | 2003-216831 A | 7/2003 |
| JP | 2004-272680 A | 9/2004 |
| JP | 2006-048571 A | 2/2006 |
| WO | 2007/037350 A1 | 4/2007 |

* cited by examiner

*Primary Examiner* — Sath V Perungavoor
*Assistant Examiner* — Jeffery Williams
(74) *Attorney, Agent, or Firm* — Sughrue Mion, PLLC

(57) ABSTRACT

There are provided an information providing system, an information providing method and an information providing program capable of providing information for enabling conditions of a horse entered in a race to be rapidly confirmed. A system control unit 15 according to the present application acquires moving image data in which horses are captured, extracts a plurality of items of still image data of the horses from the acquired moving image data, generates a horse list displaying the horse names for which a link to acquire and display the still image data by a user terminal 3-*k* is set, and distributes it to the user terminal 3-*k*.

7 Claims, 12 Drawing Sheets

FIG.3

MOVING IMAGE DB 141

| moving image data | file:TKY10123D |
| --- | --- |
| | file:TKY10124D |
| | file:TKY10125D |
| | . |
| | . |
| | . |
| | file:TKY10132D |

(A)

STILL IMAGE DB 142

| still image data | file:TKY10123S | | |
| --- | --- | --- | --- |
| | JP001010S-1 | JP001010S-2 | JP001010S-3 |
| | JP000123S-1 | JP000123S-2 | JP000123S-3 |
| | . | . | . |
| | . | . | . |
| | . | . | . |
| | JP012295S-1 | JP012295S-2 | JP012295S-3 |

(B)

HORSE INFORMATION DB143

| RACE ID | TKY10123 | | |
| --- | --- | --- | --- |
| RACETRACK ID | TKY | | |
| DATE | 2008/3/1 | | |
| RACE ENTRY TIME | 15:30 | | |
| RACE NUMBER | 11 | | |
| RACE NAME | ○○CUP | | |
| NUMBER OF HORSE | 16 | | |
| PRIZE MONEY OF THE 1ST | ○○○yen | | |
| PRIZE MONEY OF THE 2nd | ○○○yen | | |
| PRIZE MONEY OF THE 3rd | ○○○yen | | |
| | | HORSE NUMBER | BRACKET NUMBER |
| ENTERED HORSE | JP001010 | 1 | 1 |
| | JP000123 | 2 | 1 |
| | . | . | . |
| | . | . | . |
| | . | . | . |
| | JP012295 | 16 | 8 |

| BRACKET NUMBER | HORSE NUMBER | HORSE NAME | SEX/AGE COLOR OF HAIR | HORSE WEIGHT INCREASE OR DECREASE | BURDEN WEIGHT | JOCKEY'S NAME | HORSE OWNER'S NAME TRAINER | PASTURE PLACE OF PRODUCTION |
|---|---|---|---|---|---|---|---|---|
| 1 | 1 | ○○teio | Mare/3 bay | | 55.0 | OtaOro (Funabashi) | OyamaOo OgawaOzo | ○○PASTURE HOKKAIDO |
| 2 | 2 | △△star | Mare/4 bay | | 55.0 | △ta△ro (Kawasaki) | △yama△o △gawa△zo | △△PASTURE HOKKAIDO |
| 3 | 3 | ××tiger | Mare/3 bay | | 55.0 | ×ta×ro (Kawasaki) | ×yama×o ×gawa×zo | ××PASTURE HOKKAIDO |

2009. ○. ×12th ○○horserace 1stday | 1R | 2R | 3R | 4R | 5R | 6R | 7R | 8R | 9R | 10R | 11R | 12R

11R

○○CUP RACE B3
Selection Specially
Thoroughbred system General
Dirt 1800m (14 horse) Start schedule time 20:15
PRIZE 1st: 2,500,000yen 2nd: 875,000yen 3rd: 500,000yen
MONEY 4th: 375,000yen 5th: 250,000yen Vote deadline is 4 minutes' ago of start.    ODDS    RACE RESULT    ENTERED HORSE LIST    VOTE ANTICIPATION

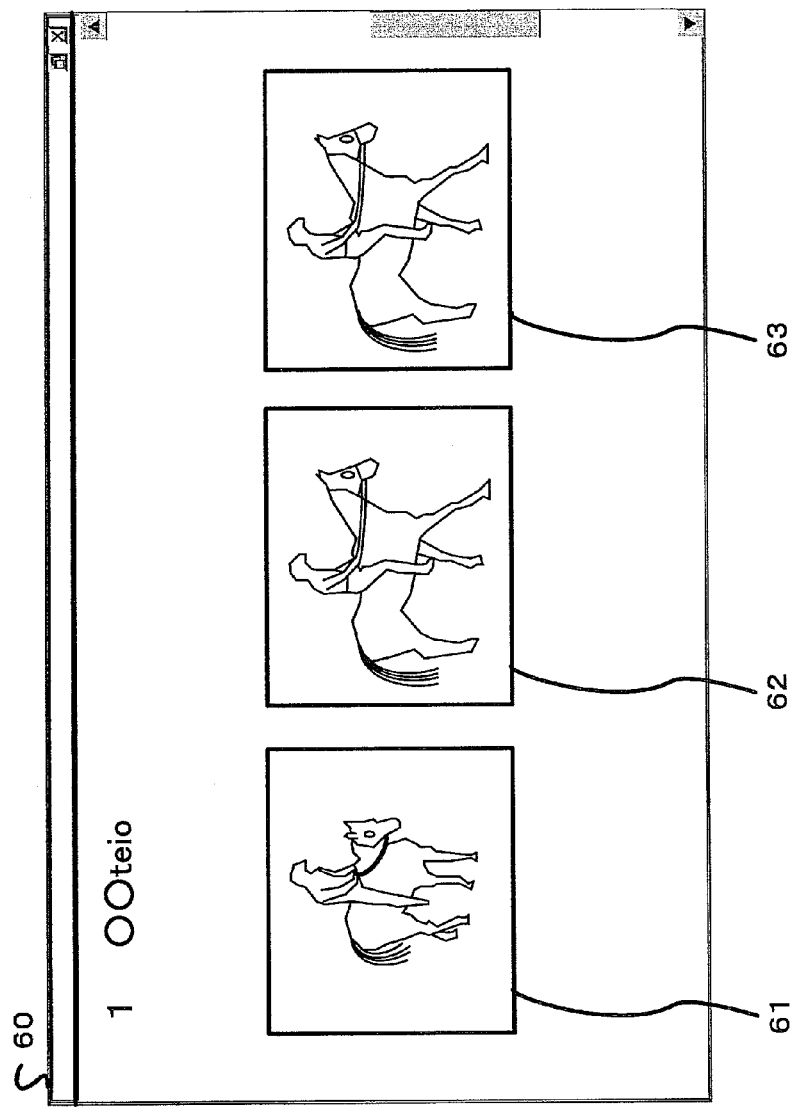

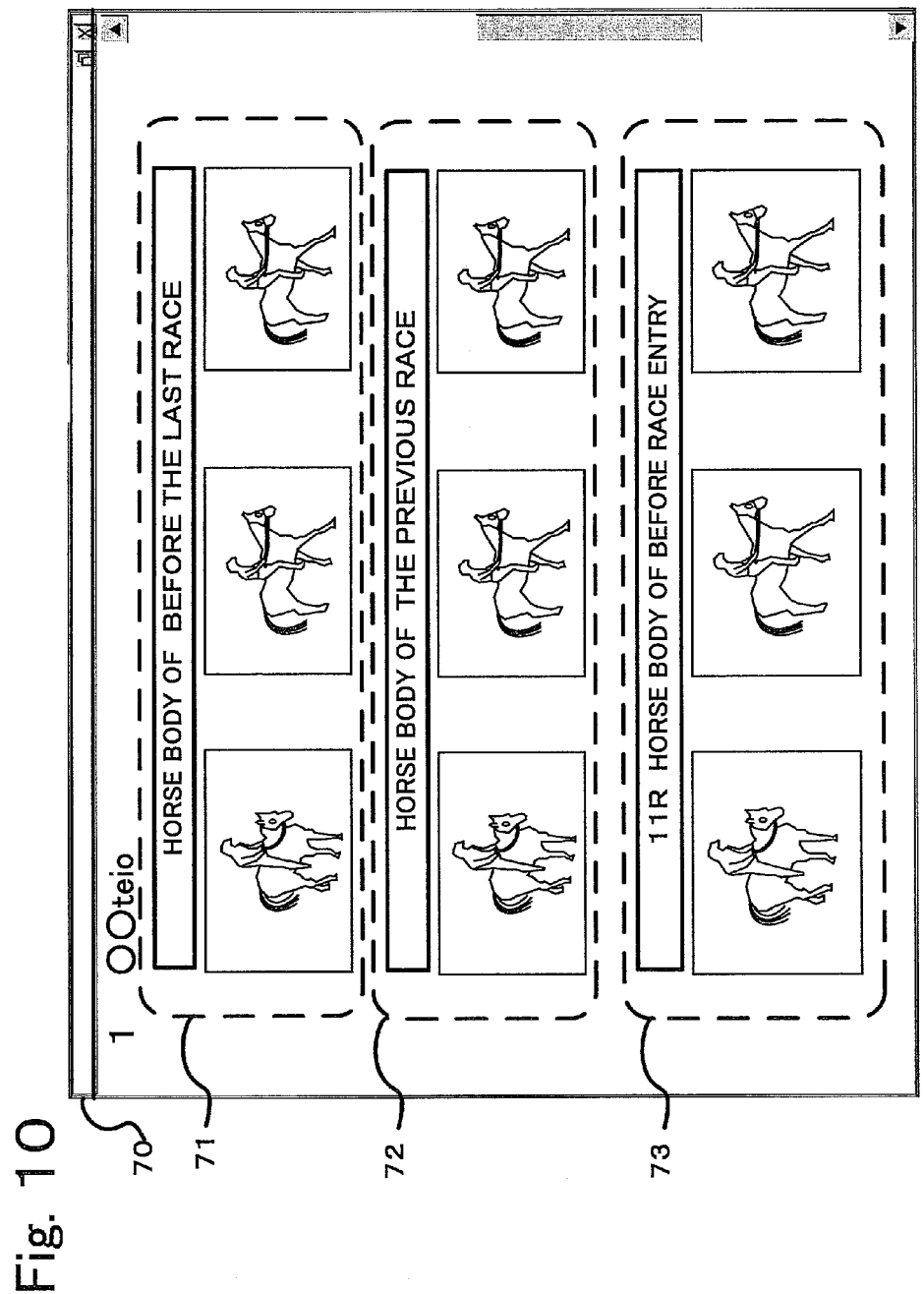

Fig. 11

| BRACKET NUMBER | HORSE NUMBER | HORSE NAME | SEX/AGE COLOR OF HAIR | HORSE WEIGHT INCREASE OR DECREASE | BURDEN WEIGHT | JOCKEY'S NAME | HORSE OWNER'S NAME TRAINER | PASTURE PLACE OF PRODUCTION | IMAGE DISPLAY |
|---|---|---|---|---|---|---|---|---|---|
| 1 | 1 | ○○teio | Mare/3 bay | | 55.0 | OtaOro (Funabashi) | Oyama○o O gawa○zo | ○○PASTURE HOKKAIDO | ▷ |
| 2 | 2 | △△star | Mare/4 bay | | 55.0 | △ta△ro (Kawasaki) | △yama△o △gawa△zo | △△PASTURE HOKKAIDO | ▷ |
| 3 | 3 | ××tiger | Mare/3 bay | | 55.0 | ×ta×ro (Kawasaki) | ×yama×o ×gawa×zo | ××PASTURE HOKKAIDO | ▷ |

2009.○.×12th ○○horserace 1stday  1R 2R 3R 4R 5R 6R 7R 8R 9R 10R 11R 12R

○○CUP RACE B3
Selection Specially
Thoroughbred system General
Dirt 1800m(14 horse) Start schedule time 20:15
PRIZE 1st:2,500,000yen 2nd:875,000yen 3rd:500,000yen
MONEY 4th:375,000yen 5th:250,0000yen Vote deadline is 4 minutes' ago of start.   ODDS   RACE RESULT   ENTERED HORSE LIST   VOTE ANTICIPATION

HORSE BODY INFORMATION PROVISION SYSTEM, HORSE BODY STILL IMAGE DATA EXTRACTION METHOD, HORSE BODY STILL IMAGE DATA EXTRACTION PROGRAM AND COMPUTER-READABLE RECORDING MEDIUM

CROSS REFERENCE TO RELATED APPLICATIONS

This application is a National Stage of International Application No. PCT/JP2010/071356 filed Nov. 30, 2010, claiming priority based on Japanese Patent Application No. 2009-272149 filed Nov. 30, 2009, the contents of all of which are incorporated herein by reference in their entirety.

TECHNICAL FIELD

The present invention relates to a technical field of an information providing system for providing pages (Web pages) including predetermined information to terminal devices connected via a network such as Internet or Intranet, and particularly to a technique for creating and providing pages including information on horse bodies of horses entered in a race.

BACKGROUND ART

A horse race as one of races is such that entered horses with jockeys race to determine the fastest for a predetermined distance in the racetrack. Race spectators may predict an order of arrival of the entered horses and purchase a betting ticket. The spectators who purchase betting tickets can receive dividends according to the race result. A spectator who wants to purchase a betting ticket can confirm the conditions of the entered horses immediately before the start of the race in a paddock in the racetrack when predicting the order of arrival of the entered horses.

The technique described in Patent Document 1 discloses a technique for transmitting information on entered horses in a paddock as moving image to mobile terminals. With the technique, a spectator who wants to purchase a betting ticket can confirm the conditions of the entered horses immediately before the race without actually visiting the paddock.

CITATION LIST

Patent Document

Patent Document 1: Japanese Patent Application Laid-Open Publication No. 2006-48571

DISCLOSURE OF INVENTION

Problems to be Solved by the Invention

However, in the paddock, a plurality of horses entered in a race walk during a period of time immediately before the start of the race, which is presented to the public. Then, a spectator who wants to purchase a betting ticket visually observes the conditions of hair and body parts' muscles of a plurality of entered horses walking in the paddock, confirms the conditions of the entered horses immediately before the start of the race, and finally has to purchase the betting ticket until the sales deadline of the betting tickets. Therefore, a spectator who wants to purchase a betting ticket has to confirm the conditions of as many entered horses as possible in a short time until the sales deadline of the betting tickets from the presentation of the entered horses in the paddock.

In the technique described in Patent Document 1, a spectator who wants to purchase a betting ticket has to continuously watch transmitted moving image until he/she can visually confirm the whole body of a horse walking in the paddock, and the conditions of the entered horses are difficult to confirm in a short time. Particularly, the moving image have to be viewed until the sales deadline of the betting tickets and thus there is not enough time to confirm all the entered horses. When there are a plurality of races almost at the same time in a plurality of racetracks, it is substantially impossible to confirm the conditions of a plurality of entered horses on the moving image.

It is an object of the present invention to provide information for enabling the conditions of a plurality of horses entered in the race to be rapidly confirmed. It is another object of the present invention to provide information for enabling a current condition of one horse entered in the race and a past condition of the horse entered in the race to be visually confirmed. It is still another object of the present invention to provide information for enabling a current condition of one horse entered in the race and a current condition of another horse entered in the race to be visually confirmed. It is still another object of the present invention to generate still image of a horse body having a posture capable of being identified from captured moving image.

Solutions to the Problems

In order to achieve the above object, an invention according to claim 1, a horse body information provision system includes: a moving image data storage device for storing moving image data of a horse entered in a race in association with horse information of the horse entered in the race; a still image data extraction device for extracting still image data representing a horse body close to a horse body posture shown in sample image from the moving image data stored in the moving image data storage device; a still image data storage device for storing the extracted still image data in association with the horse information; a generation device for generating Web page data to display the still image data associated with the horse information, in case where an operation for acquiring the still image data is selected in a Web page displaying the horse information for which a link to acquire and display the still image data is set on a terminal device; and a distribution device for distributing the generated Web page data to the terminal device.

According to the present invention, still image data representing a horse body close to a horse body posture shown in sample image is extracted and then the still image data of the respective entered horses is stored in association with horse information of the horse entered in the race. The web page data to display the still image data of the horse bodies associated with the horse information in a common horse body posture is generated and distributed. Therefore, a user can rapidly confirm (grasp) and compare the conditions of the bodies of the horses at first view.

An invention according to claim 2, in the horse body information provision system according to claim 1, the still image data storage device stores still image data extracted last and still image data extracted in past, and in case where an operation for acquiring still image data of one horse is selected in the Web page displaying the horse information for which the link to acquire and display the still image data extracted last and the still image data extracted in the past is set, the generation device generates Web page data to display the last still image data close to a horse body posture shown in sample image regarding the one horse and the past sill image data close to a horse body posture shown in the same sample image.

According to the present invention, the web page data to display current and past still image data of one horse associated with the horse information is generated and distributed. Therefore, a user can confirm and compare the current and past conditions of one horse with a horse body posture close to the horse body posture of the sample image.

An invention according to claim 3, in the horse body information provision system according to claim 1, the still image data storage device stores still image data of a plurality of horses entered in the race, and in case where an operation for acquiring still image data of two or more horses out of the plurality of horses is selected in the Web page displaying the horse information for which the link to acquire and display the still image data of the plurality of horses is set, the generation device generates Web page data to display a plurality of last still image data close to a horse body posture shown in sample image regarding the two or more horses.

According to the present invention, the web page data to display the still image data of a plurality of horses entered in a predetermined race is generated and distributed. Therefore, a user can immediately confirm and compare the conditions of plurality of horses with a horse body posture close to the horse body posture of the sample image.

An invention according to claim 4, in the horse body information provision system according to claim 1, the still image data extraction device includes: a display unit for displaying the moving image data; a sample image acquisition unit for accepting an input of a horse body posture shown in a sample image of one horse while the moving image data is being displayed on the display unit; and an extraction unit for extracting the still image data of the entered horse from the moving image data based on the accepted horse body posture of the sample image.

According to the present invention, in response to accepting the input of the horse body posture of the sample image, the still image data is extracted from the moving image data based on the accepted horse body posture of the sample image. Therefore, a user can confirm and compare the conditions of entered horse with the horse body posture close to the horse body posture of the sample image.

An invention according to claim 5, in the horse body information provision system according to claim 4, after the sample image acquisition unit accepts the input of the horse body posture, the extraction unit extracts a horse body posture of a second sample image close to the horse body posture of the sample image at a predetermined period of time.

According to the present invention, after the sample image acquisition unit accepts the input of the sample image, the extraction unit acquires sample images every definite period of time progress. Therefore, after acquiring each sample image, the still image of horse body close to each sample image can be extracted.

An invention according to claim 6, a horse body still image data extraction method for extracting still image data representing a horse body of a horse entered in a race from moving image data of the horse entered in the race, includes: a still image data extraction step for extracting still image data representing the horse body close to a horse body posture shown in sample image from the moving image data; a still image data storage step for storing the extracted still image data in association with a horse information of the horse entered in the race; a generation step for generating Web page data to display the still image data associated with the horse information, in case where an operation for acquiring the still image data is selected in a Web page displaying the horse information for which a link to acquire and display the still image data is set on a terminal device; and a distribution step for distributing the generated Web page data to the terminal device.

An invention according to claim 7, a computer-executable extraction program for extracting still image data representing a horse body of a horse entered in a race from moving image data of the horse entered in the race, causes a computer to execute: a still image data extraction step for extracting still image data representing the horse body close to a horse body posture shown in sample image from the moving image data; a still image data storage step for storing the extracted still image data in association with a horse information of the horse entered in the race; a generation step for generating Web page data to display the still image data associated with the horse information, in case where an operation for acquiring the still image data is selected in a Web page displaying the horse information for which a link to acquire and display the still image data is set on a terminal device; and a distribution step for distributing the generated Web page data to the terminal device.

Effects of the Invention

According to the present invention, still image data representing a horse body close to a horse body posture shown in sample image is extracted and then the still image data of the respective entered horses is stored in association with horse information of the horse entered in the race. The web page data to display the still image data of the horse bodies associated with the horse information in a common horse body posture is generated and distributed. Thus a user viewing a display screen displaying the still image data can rapidly grasp the conditions of the whole bodies of the entered horses in a common horse body posture in a short time from the start of walking in the paddock to the end of ticket sales.

BRIEF DESCRIPTION OF THE DRAWINGS

FIG. 3 is a table indicating information stored in the moving image DB 141, the still image DB 142 and the horse information DB 143 constructed in the storage unit 14.

FIG. 8 is a diagram showing an entered horse list on the display of the display unit 32.

FIG. 9 is a diagram showing an exemplary screen in which a web page displaying a plurality of items of acquired still image data associated with ○○ teio 52 is displayed in the window screen on the display of the display unit 32.

FIG. 10 is a diagram showing an exemplary screen displayed in the window screen on the display of the display unit 32 which acquires the Web page data to display a plurality of items of still image data extracted last (such as the still image data extracted from the moving image data captured in the paddock before the race) and a plurality of items of still image data extracted in the past.

FIG. 11 is an exemplary screen displaying the entered horse list in which check boxes and a button for enabling a plurality of horse names to be selected are displayed.

An embodiment according to the present invention will be described below with reference to the drawings.

Figure 1:
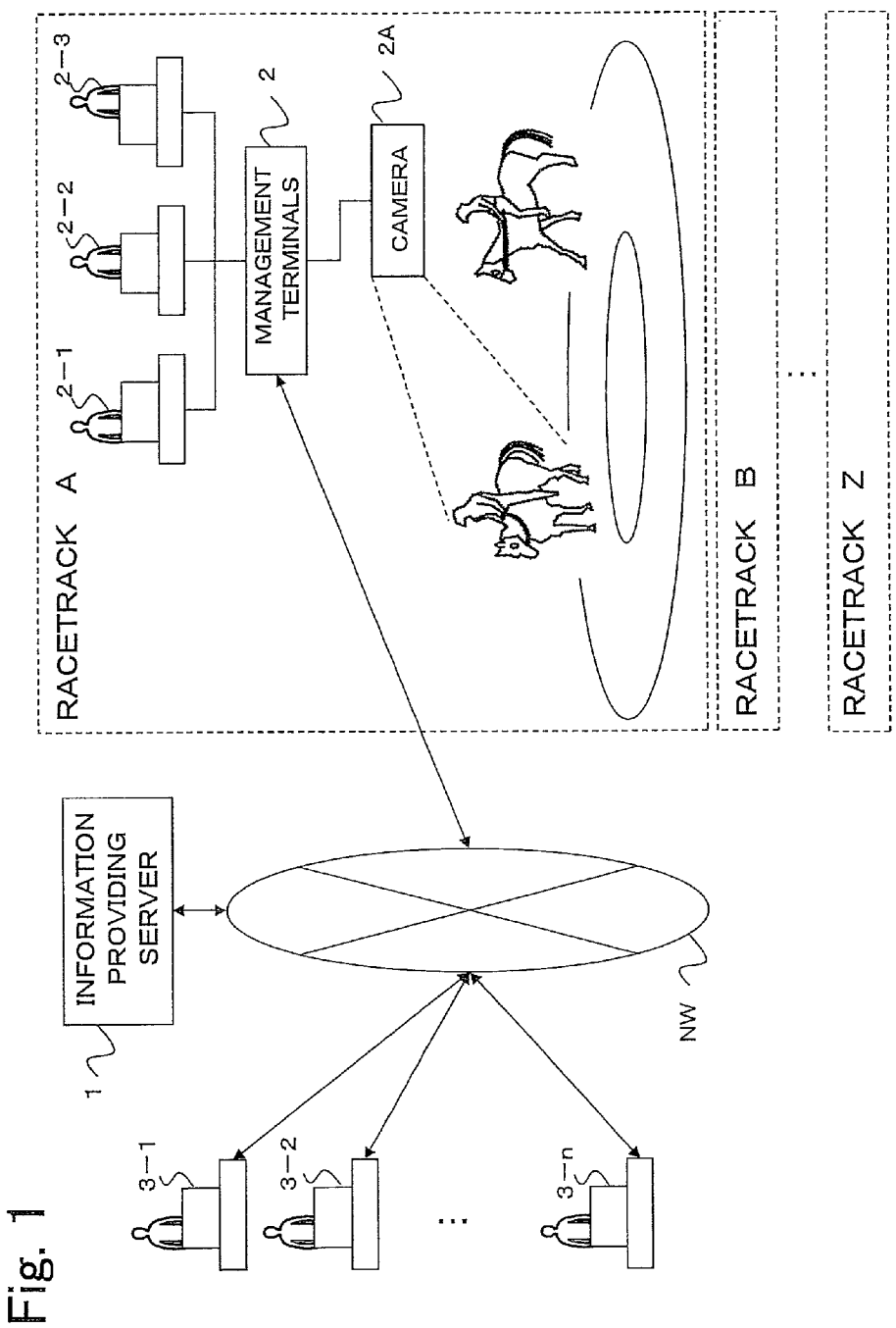
FIG. 1 is a diagram showing an exemplary schematic structure of the information providing system according to the present embodiment.

First, a structure and schematic functions of an information providing (provision) system (exemplary horse body information providing system) according to one embodiment of the present invention will be described with reference to FIG. 1. FIG. 1 is a diagram showing an exemplary schematic structure of the information providing system according to the present embodiment.

As shown in FIG. 1, the information providing system includes a horse body information providing server 1 (one example of a moving image data storage device, a still image data extraction device, a still image data storage device, a generation device and a distribution device). The information providing server 1 is connected to management terminals 2 in a plurality of racetracks A to Z via a network NW. The information providing server 1 and the management terminals 2 can mutually exchange data by use of a communication protocol such as TCP/IP. The racetracks A to Z are each provided with the management terminal 2, a camera 2A installed in a paddock, and terminals 2-1 to 2-3 for visitors at the racetrack A. The camera 2A and the terminals 2-1 to 2-3 are connected to the management terminal 2 in a wired or wireless manner. The racetracks B to Z have the same construction as the racetrack A but may not be provided with the terminals 2-1 to 2-3. The camera 2A captures moving image (moving picture) of entered horses walking in the paddock. The captured moving image is transmitted as moving image data to the management terminal 2. The moving image data is transmitted to the information providing server 1 via the network NW.

The information providing server 1 and a plurality of user terminals 3-$k$ (k=1, 2-n) (exemplary terminal devices) can mutually exchange data by use of a communication protocol such as TCP/IP via the network NW. The network NW is constructed with Internet, a dedicated communication line (such as CATV (Community Antenna Television) line), a mobile communication network (including base stations) and a gateway, for example. The information providing server 1 and the terminals 2-1 to 2-3 may mutually exchange data by use of a communication protocol such as TCP/IP via the network NW not via the management terminal 2.

In the information providing system with the structure, the information providing server 1 functions as a Web server provided for managing an information providing site which provides information on horses entered in a race, for example. The information providing server 1 distributes Web page data to the terminals 2-1 to 2-3 and the user terminal 3-$k$ in response to a HTTP (Hyper Text Transfer Protocol) request from the terminals 2-1 to 2-3 and the user terminal 3-$k$. The terminal or user terminal displays the received Web page data on a display with a Web browser. The displayed Web page displays therein a list of entered horses (which will be simply referred to as "entered horse list) indicating bracket number, horse number, horse name, sex/age, color of hair, horse weight, jockey's name, horse owner's name and the like of the horses entered in the race (exemplary horse information on horses in the race).

The Web page data according to the present embodiment sets therein a link to acquire and display Web page data to display still image data on horses entered in a race. The Web page data to display still image data is transmitted from the information providing server 1. The Web page data is one item of Web page data displaying therein still image data extracted from current (present) or past moving image data. When acquiring still image data from the information providing server 1 with a user's predetermined operation (such as selecting the link with a mouse), the terminals 2-1 to 2-3 and the user terminal 3-$k$ display the acquired Web page on the display with the Web browser.

Figure 2:
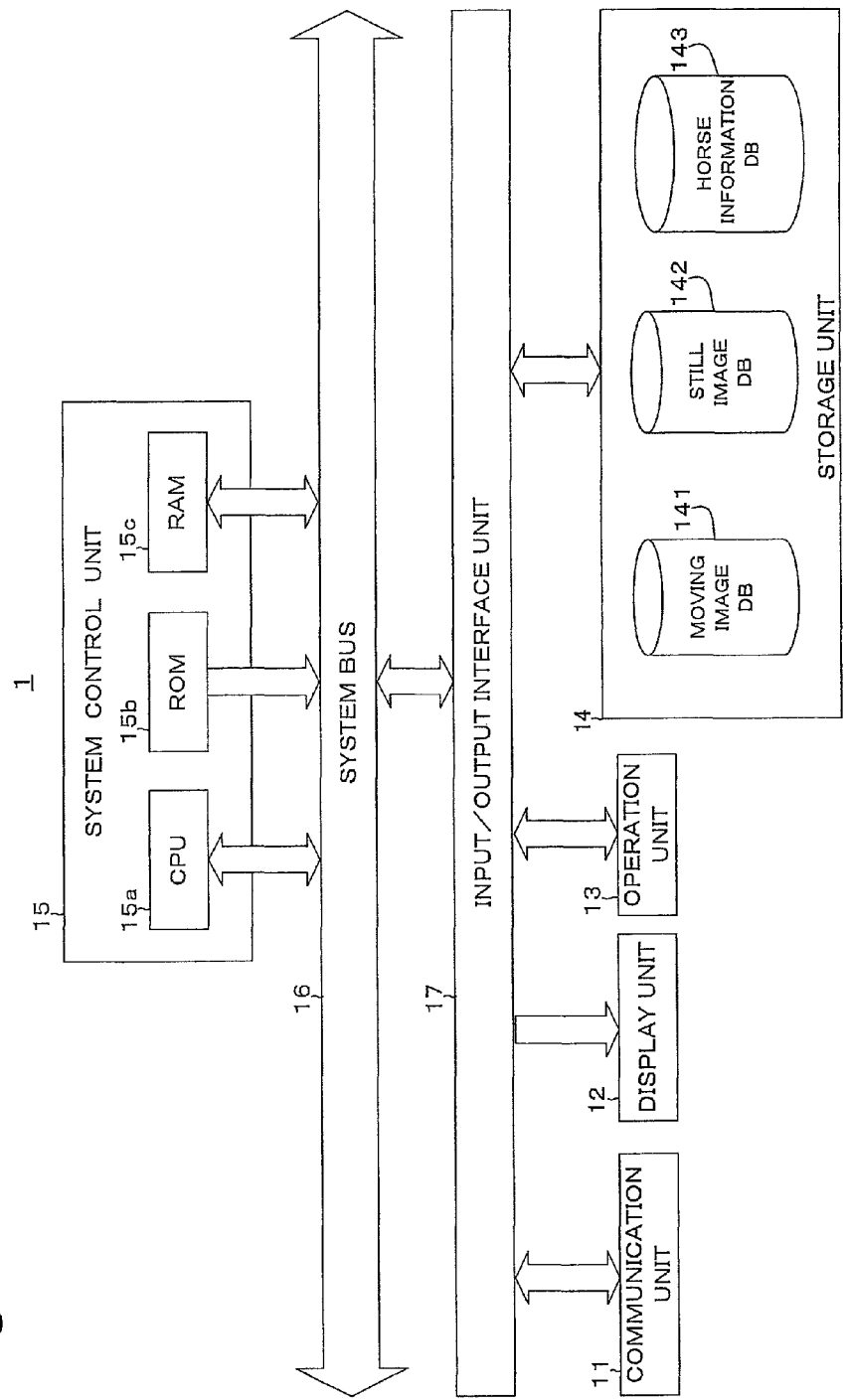
FIG. 2 is a block diagram showing an exemplary schematic structure of the information providing server 1 according to the present embodiment.

FIG. 2 is a block diagram showing an exemplary schematic structure of the information providing server 1 according to the present embodiment. As shown in FIG. 2, the information providing server 1 includes a communication unit 11, a display unit 12, an operation unit 13, a storage unit 14, an input/output interface unit 17, and a system control unit 15 (one example of display unit, sample image acquisition unit and extraction unit). The system control unit 15 and the input/output interface unit 17 are connected with each other via a system bus 16. The communication unit 11 is connected to the network NW to control a communication state between the management terminal 2 and the user terminal 3-$k$. In the present embodiment, the communication unit 11 is connected to the network NW and functions as an interface for acquiring moving image data transmitted from the management terminal 2. Specifically, a well-known VOD (Video on Demand) or IP multicast broadcasting technique is applied, and the management terminal 2 receiving a request from the information providing server 1, for example, transmits the requested moving image data to the information providing server 1. The information providing server 1 receives the moving image data via the communication unit 11. The display unit 12 includes a display for displaying the acquired moving image data thereon. The operation unit 13 includes a keyboard and a mouse, for example. The storage unit 14 is configured of a hard disc drive, for example, and stores therein an operating system and various programs such as still image data extraction program. The still image data extraction program according to the present invention may be acquired (downloaded) from a predetermined server via the network NW, for example, or may be recorded in a non-transitory computer-readable storage medium (recording medium in which programs are readably recorded by a computer) such as CD (Compact Disc) or DVD (Digital Versatile Disc) and read by a drive. The storage unit 14 includes a moving image DB 141, a still image DB 142 and a horse information DB 143. The databases may be constructed in a database server for managing the databases. In this case, the information providing server 1 may be configured as a group of servers including the database server and other servers.

The moving image DB 141, the still image DB 142 and the horse information DB 143 included in the storage unit 14 will be described with reference to FIG. 3. FIG. 3 is a table indicating information stored in the moving image DB 141, the still image DB 142 and the horse information DB 143 constructed in the storage unit 14. The moving image DB 141 stores (records) therein moving image data captured by the camera 2A in each racetrack (FIG. 3(A)), and the moving image data is converted into a format such as WMV (Windows Media Video) or MP4 (MPEG Audio Layer-4) to be recorded. Each item of moving image data is stored in association with the horse information shown in FIG. 3(C) with a file number per race. The horse information includes race ID, racetrack ID, date and the like as shown in FIG. 3(C).

As described in detail later, the still image DB 142 stores therein still image data of a plurality of entered horses extracted from the moving image data captured and stored in the moving image DB 141 (FIG. 3(B)). The still image DB 142 stores therein still image data extracted last and still image data extracted in the past. The respective items of still image data are stored in association with the horse information in FIG. 3(C) with file numbers.

For the still image data, the extracted horses displayed in the moving image data are fetched as still image files such as JPEG (Joint Photographic Experts Group) by application of a well-known capture technique, for example. The capture technique is realized by a capture device (not shown) provided in the information providing server 1 (such as expansion card with the capture function) or capture software with the capture function installed in the information providing server 1.

Figure 4:
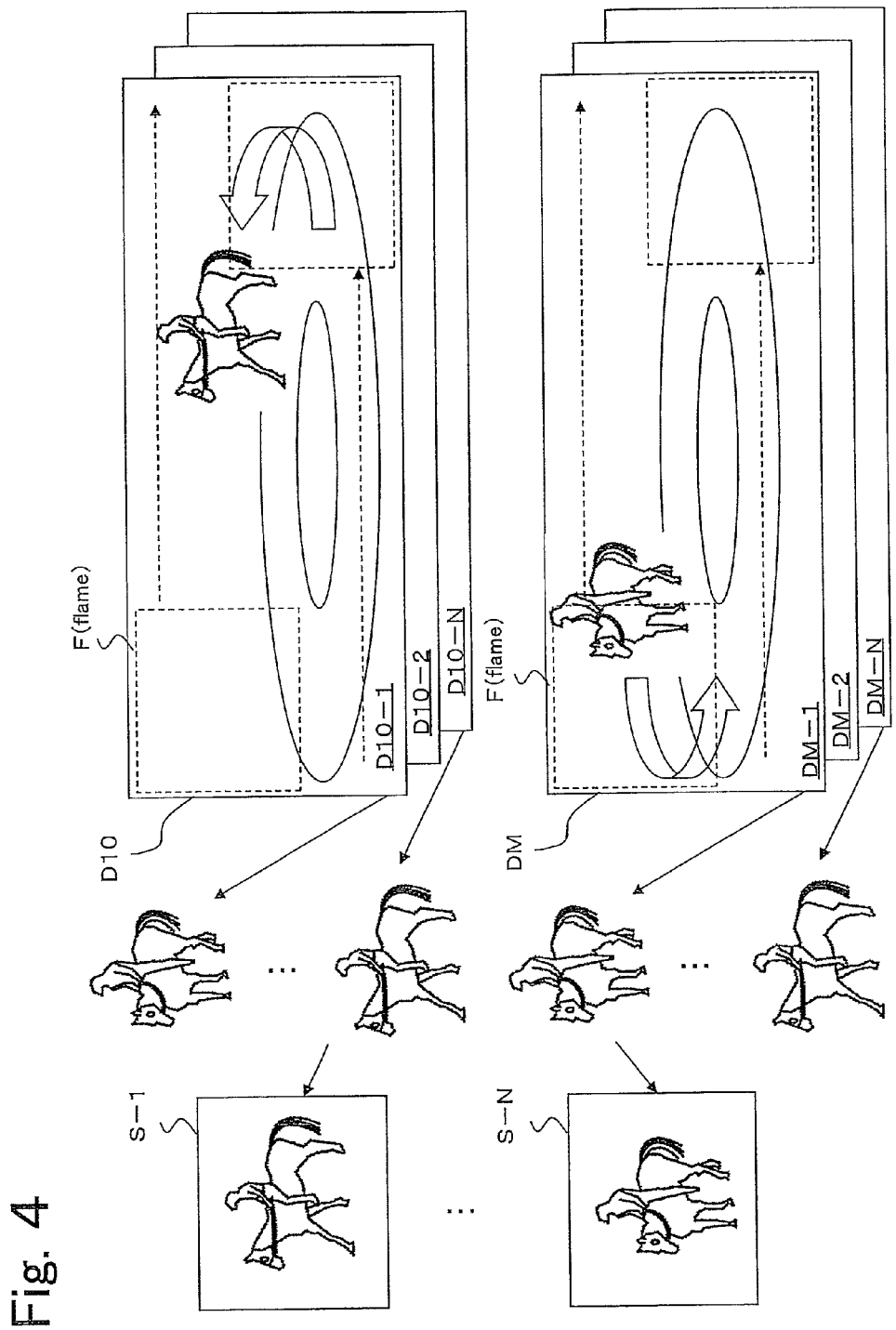
FIG. 4 is a figure showing an example of processing which extracts still image data from moving image data.

An example in which still image data is generated from moving image data will be described with reference to FIG. 4. Moving image data D10 stored in the moving image DB 141 is configured of frame D10-1 to frame D10-N. The storage unit 14 in the information providing server 1 stores sample images S1 to SN therein. First, the system control unit 15 converts a sample image into a mosaic image. For example, the system control unit 15 converts the sample image S1 in 240 pixels×240 pixels into a mosaic image in 16×16 to obtain 256 pixels. A resolution may be reduced in order to specify an area close to the sample image. Then, the system control unit 15 changes a frame size into a definite size for the frame D10-1 and scans the mosaic image in the frame. An inner product of a density of each pixel of the sample image per area and a density of each pixel of the area is calculated. The density is indicated with brightness or a numerical value of RGB, for example, but may employ any numerical value. The inner product is calculated to decide a similarity between the sample image and the area, thereby extracting the area closest to the sample image S1 as temporary still image data for the frame D10-1. A correlation between the sample image and the area is decided so that the area closest to the sample image is specified for the frame D10-1. The system control unit 15 repeats the same processings for all of the frame D10-1 to the frame D10-N. Then, the system control unit 15 ranks the temporary still image data (1 to N items) extracted per frame again according to the similarity with the sample image S1 and extracts the closest temporary still image data as still image data. The ranking method is performed by deciding the correlation between the sample image and the area as described above. The same processings are repeated also for other sample images S2 to SN so that the still image data of a horse body posture (posture of horse body) close to the sample image is extracted from the moving image data. That is, the horse body of the entered horse close to the horse body posture of the sample image is extracted as the still image data from the moving image data. In other words, the still image data representing a horse body close to a horse body posture shown in sample image is extracted from the moving image data The still image DB 142 stores therein the still image data extracted in the above processings in association with the horse information per horse body. The horse information DB 143 stores therein a HTML (Hyper Text Markup Language) document file, an XML (Extensible Markup Language) document file, an XHTML (Extensible HyperText Markup Language) document file, a file described in other programming language, and the like for constructing a Web page displaying therein the entered horse list to be provided to the user terminal 3-*k*. Bracket number, horse number, horse name, sex/age, color of hair, horse weight, jockey's name, horse owner's name and the like of the horses entered in the race in the entered horse list displayed on the Web page are described in tags in the HTML document by way of example. More specifically, in the range of the entered horse list surrounded by <TABLE border="1"> to </TABLE>, the rows are set per horse name in <TR> to </TR> and the items are set in <TD> to </TD> such as bracket number, horse number, sex/age, color of hair, horse weight, jockey's name, horse owner's name and the like.

The HTML document (the horse information) is set therein a link to acquire and display the still image data. Therefore, when the acquisition of still image data is selected and operated (That is, in case where an operation for acquiring the still image data is selected) in the Web page displayed on the user terminal 3-*k* and the horse name in the entered horse list is selected and operated, for example, Web page data to display the still image data associated with the horse name is generated by the information providing server 1, and distributed to the user terminal 3-*k*. The selecting operation herein corresponds to clicking the horse name or the like displayed in the entered horse list through the user's mouser operation, but is not limited thereto. For example, when the horse information such as the horse name is displayed on the display with a touch panel, the horse information may be selected (pressed) with a finger or stylus. The horse information DB 143 stores therein the horse names in association with a plurality of still image data URLs (such as http://www.yyy.zzz/xxx/yyy/zzz.html). When a horse name displayed in the entered horse list is selected and operated, an instruction of setting the link to acquire and display the file such as <a href="http://www-.yyy.zzz/xxx/yyy/zzz.html">horsename</a> is described in the HTML document.

Turning to the description of FIG. 2, the input/output interface unit 17 performs an interface processing between the communication unit 11, the display unit 12, the operation unit 13 and the storage unit 14, and the system control unit 15. The system control unit 15 is configured of a CPU (Central Processing Unit) 15*a*, a ROM (Read Only Memory) 15*b*, and a RAM (Random Access Memory) 15*c*. The system control unit 15 generates the Web page data in response to a HTTP request from the user terminal 3-*k*, and distributes it to the terminals 2-1 to 2-3 and the user terminal 3-*k*.

The system control unit 15 extracts still image data on a plurality of entered horses from the acquired moving image data according to an operator's instruction, for example. For example, as described above, when receiving moving image data transmitted from the management terminal 2, the system control unit 15 displays the moving image data on the display unit 12. Then, the operator visually observes the moving image data displayed on the display unit 12 continuously, and searches for a desired frame (scene) to be extracted as a horse body posture of a sample image for one entered horse from the moving image data. The display unit 12 continuously displays thereon how the entered horse is walking in the paddock. The entered horse displayed on the display unit 12 is presented in a different direction over time. Therefore, the desired frame to be extracted as a sample image can be assumed as a frame in which the entered horse displayed on the display unit 12 is presented in a direction in which the hair and muscles of the whole body of the entered horse or a muscle at each part can be grasped. When finding the desired frame to be extracted as a sample image, the operator operates the operation unit 13 (such as instruction input by the keyboard), for example, to input the instruction of starting to extract the sample image into the system control unit 15. Thereby, the system control unit 15 accepts (receives) the input of the horse body posture of the sample image of one horse.

When accepting (receiving) the input for starting to extract the sample image, the system control unit 15 extracts still image data close to the sample image from the moving image data based on the input (that is, extracts still image data of the entered horse from the moving image data based on the horse body posture of the accepted (received) sample image). Further, when searching for the desired frame to be extracted as a sample image and finding another desired frame to be extracted as the still image data, the operator can extract still image data close to the sample image from the moving image data by the operation of the system control unit 15 through the same operations. In this way, the system control unit 15 extracts the still image data close to the sample images for a plurality of entered horses from the acquired moving image data. When finishing extracting a plurality of sample images for one entered horse, the system control unit 15 uses the sample images to extract still image data of other entered horses. The order of extraction may not be the order of horse number. The still image data has only to be associated with the horse numbers. The still image data extracted in this way is extracted as a frame for rapidly grasping the hair and muscles of the whole body of the entered horse or a muscle of each part. Therefore, the user who views the display screen displaying thereon the still image data can rapidly grasp the condition of the whole body of the entered horse at first view.

The system control unit 15 may receive the input of starting to extract the sample image, and then extract the sample image periodically at a predetermined period of time. That is, the system control unit 15 may receive the input of a horse body posture of a sample image, and then extract a horse body posture of a second sample image close to the horse body posture of the sample image after a certain period of time. In this case, when receiving the input of starting to extract a sample image, the system control unit 15 first extracts still image data close to the sample image from the moving image data based on the input. The system control unit 15 extracts a predetermined amount of still image data from the moving image data after a certain period of time irrespective of the input of starting to extract the still image data (even when the input of starting to extract next still image data has not been received). In other words, when first receiving the input of starting to extract a sample image, the system control unit 15 extracts a sample image from the moving image data based on the input, and then automatically extracts a predetermined number of sample images from the moving image data. Therefore, the operator can cause the system control unit 15 to extract a plurality of sample images from the moving image data only by the input of starting to extract a sample image. Thus, the system control unit 15 can extract the sample images and the still image data from the moving image data based on the operator's simple operation. An interval (the certain period of time) at which the system control unit 15 automatically extracts the still image data from the moving image data, and the amount (the predetermined amount) of still image data to be extracted can be arbitrarily set.

When the acquisition of the still image data is selected and operated at the user terminal 3-$k$ in the Web page which displays, to the user terminal 3-$k$, the horse information for which the link to acquire and display the still image data is set (for example, the information such as horse name associated with the still image data is selected and operated), that is, in case where an operation for acquiring the still image data is selected in a Web page displaying the horse information for which a link to acquire and display the still image data is set, the system control unit 15 generates Web page data to display the still image data associated with the selected information thereon, and distributes the generated Web page data to the user terminal 3-$k$. When the acquisition of still image data of one horse is selected and operated in the Web page which displays, to the user terminal 3-$k$, the horse information for which the link to acquire and display still image data extracted last and still image data extracted in the past is set, the system control unit 15 may generate Web page data to display thereon the last still image data close to a horse body posture of a sample image of the horse (image regarding the horse) and the past still image data close to the horse body posture of the same sample image together, and distribute the generated Web page data to the user terminal 3-$k$. Further, when the acquisition of still image data of two or more of a plurality of horses entered in a predetermined race is selected and operated in the Web page which displays, to the user terminal 3-$k$, the horse information for which the link to acquire and display the still image data of the horses entered in the predetermined race is set, the system control unit 15 may generate Web page data to display a plurality of items of last still image data close to the horse body postures of the sample images of the two or more horses, and distribute the generated Web page data to the user terminal 3-$k$.

Figure 5:
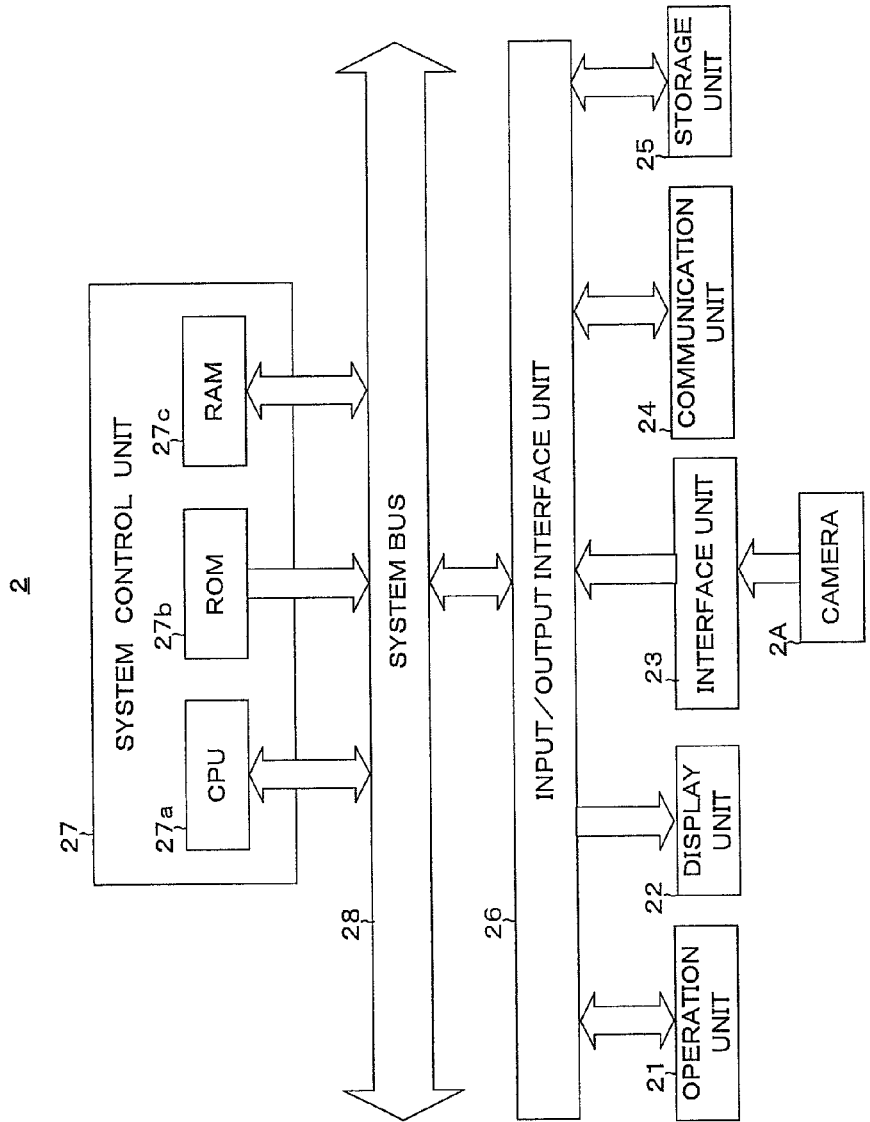
FIG. 5 is a block diagram showing a schematic structure example of the management terminal 2.

The structure and function of the management terminal 2 will be described below with reference to FIG. 5. FIG. 5 is a block diagram showing a schematic structure example of the management terminal 2. As shown in FIG. 5, the management terminal 2 includes an operation unit 21, a display 22, an interface unit 23, a communication unit 24, a storage unit 25, an input/output interface unit 26, and a system control unit 27. The system control unit 27 and the input/output interface unit 26 are connected with each other via a system bus 28. The operation unit 21 includes a keyboard and a mouse, for example. The display unit 22 includes a display for displaying a Web page and others thereon. The interface unit 23 is directed for outputting the images captured by the camera 2A to the control unit 27. The communication unit 24 is connected to the network NW to control a communication state with the information providing server 1 and others. The storage unit 25 is configured of a hard disc drive, for example, and stores therein an operating system and various programs such as information providing program.

Then, the system control unit 27 includes a CPU 27$a$, a ROM 27$b$ and a RAM 27$c$. The system control unit 27 performs an image processing based on the input data and generates moving image data indicating moving image. Further, the system control unit 27 distributes the generated moving image data to the information providing server 1 via the communication unit 24.

The system control unit 27 may extract sample images and still image data of a plurality of entered horses from the acquired moving image data according to an operator's instruction. In this case, the system control unit 27 can transmit the extracted sample images and still image data of the entered horses to the information providing server 1 via the communication unit 24. In this case, the system control unit 27 functions as one example of the display unit, the sample image acquisition unit and the extraction unit.

Figure 6:
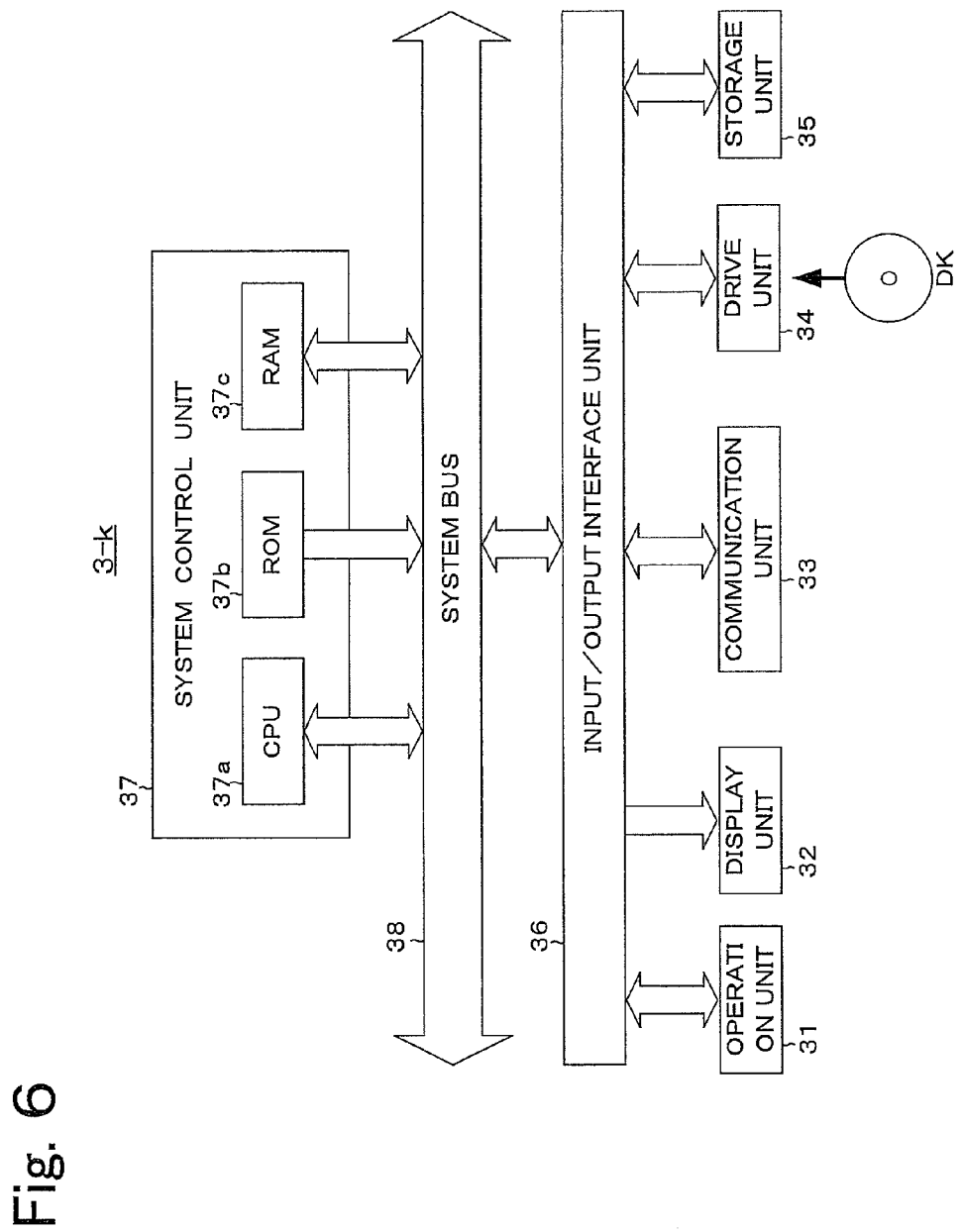
FIG. 6 is a block diagram showing a schematic structure example of the user terminal 3-k.

Then, the structures and functions of the terminals 2-1 to 2-3 and the user terminal 3-$k$ will be described below with reference to FIG. 6. FIG. 6 is a block diagram showing a schematic structure example of the user terminal 3-$k$, for example. As shown in FIG. 6, the user terminal 3-$k$ includes an operation unit 31, a display unit 32, a communication unit 33, a drive unit 34, a storage unit 35, an input/output interface unit 36, and a system control unit 37. The system control unit 37 and the input/output interface unit 36 are connected with each other via a system bus 38. The user terminal 3-k may employ a personal computer, a PDA (Personal Digital Assistant) or a cell phone, for example. The operation unit 31 includes a keyboard and a mouse, for example. The display unit 32 includes a display for displaying a Web page and other thereon. The communication unit 33 is connected to the network NW to control a communication state with the information providing server 1 and others. The drive unit 34 reads data from a disc DK (recording medium) such as CD (Compact Disc) or DVD (Digital Versatile Disc), and additionally records data on the disk DK. The storage unit 35 is configured of a hard disc drive, for example, and stores therein an operating system (O/S), a Web browser program and the like. The system control unit 37 includes a CPU 37a, a ROM 37b and a RAM 37c. The system control unit 37 executes a Web browser program under the operating system so that the entered horse list is displayed on the Web browser.

Figure 7:
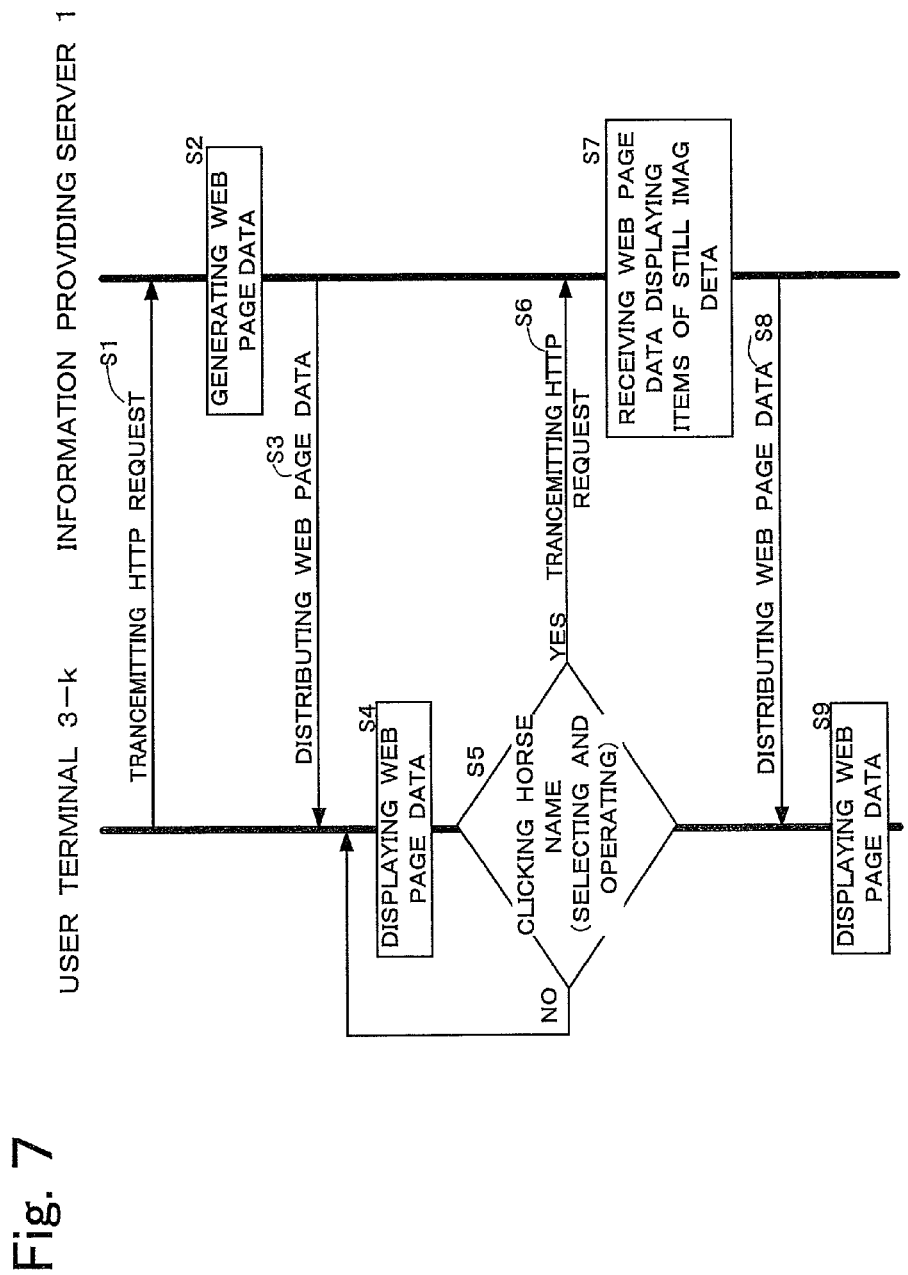
FIG. 7 is a sequence diagram showing the operations of the information processing system in response to the requests from the user terminal 3-k according to the present embodiment.

The operations of the information providing system in response to requests from the user terminal 3-k according to the present embodiment will be described below with reference to FIG. 7. The operations of the terminals 2-1 to 2-3 are substantially the same. FIG. 7 is a sequence diagram showing the operations of the information processing system in response to the requests from the user terminal 3-k according to the present embodiment. As shown in FIG. 7, when a Web browser is activated in the user terminal 3-k and a HTTP request is transmitted from the system control unit 37 to the information providing server 1 (step S1), the system control unit 15 generates Web page data configuring the entered horse list in response to the request (step S2), and distributes the Web page data to the user terminal 3-k (step S3). The system control unit 37 at the user terminal 3-k displays the acquired Web page configuring the entered horse list in the window screen on the display of the display unit 32 as the entered horse list (step S4).

The entered horse list on the display of the display unit 32 will be described below with reference to FIG. 8. FIG. 8 is a diagram showing a entered horse list on the display of the display unit 32.

As shown in FIG. 8, a entered horse list 50 displays therein information 51 indicating date/time and racetrack of a race to be held, and bracket number, horse number, horse name, sex/age, color of hair, horse weight, jockey's name, horse owner's name of horses entered in the race. Further, ○○ teio 52, ΔΔ star 53, and xx tiger 54 are displayed as horse name. When the user selects (for example, the user clicks with the mouse) "vote tab" displayed on the entered horse list 50, he/she can purchase a betting ticket of the race (so-called, Internet voting). Herein, the entered horse list 50 is directed for providing the information to be referred to when the user purchases a betting ticket. ○○ teio 52, ΔΔ star 53, and xx tiger 54 are set the link to acquire and display the corresponding still image data, respectively. ○○ teio 52, ΔΔ star 53, and xx tiger 54 are displayed with underlined for indicating the set link. The display indicating the set link is not limited thereto, and the horse names may be emphasized with thick line for display, or displayed with blinking. When the acquisition of the still image data of ○○ teio 52 is selected and operated by the operation unit 31 at the user terminal 3-k (for example, ○○ teio 52 is clicked with the mouse of the operation unit 31), the system control unit 15 generates (or may simply acquire) Web page data indicating a plurality of items of still image data associated with ○○ teio 52 and distributes it to the user terminal 3-k. Similarly, the system control unit 15 generates Web page data to display the plurality of items of still image data associated with ΔΔ star 53 when the acquisition of the still image data of ΔΔ star 53 is selected and operated, and generates Web page data to display the plurality of items of still image data associated with xx tiger 54 when the acquisition of the still image data of xx tiger 54 is selected and operated, and distributes them to the user terminal 3-k, respectively.

Turning to the explanation of FIG. 7, when the acquisition of still image data of one horse (such as ○○ teio 52) is selected and operated (○○ teio 52 is clicked) by the operation unit 31 in the user terminal 3-k (step S5: YES), the system control unit 37 transmits a HTTP request to the information providing server 1 (step S6). The HTTP request is for distributing the Web page data to display the still image data associated with the horse information of the horse to the user terminal 3-k. The system control unit 15 receiving the HTTP request acquires the Web page data to display the plurality of items of still image data associated with the horse information of the horse (step S7), and distributes it to the user terminal 3-k (step S8). Then, the system control unit 37 in the user terminal 3-k displays the Web page displaying the plurality of items of still image data associated with the horse information of the horse in the window screen on the display of the display unit 32 (step S9).

FIG. 9 is a diagram showing an exemplary screen in which a web page displaying a plurality of items of acquired still image data associated with ○○ teio 52 is displayed in the window screen on the display of the display unit 32. As shown in FIG. 9, three still images 61 to 63 are displayed as the Web page displaying therein the plurality of items of still image data associated with ○○ teio 52 in the window screen 60. The three still images 61 to 63 are such that the plurality of items of still image data extracted from the acquired moving image data are displayed as the Web page. In the present embodiment, the three still images are displayed as the plurality items of still image data associated with the horse name in the Web page, but are not limited thereto and the number of still images may be arbitrarily set.

As described above, the operator designates (instructs) to display the whole body of ○○ teio 52 so that the still images 61 to 63 according to the present embodiment are extracted by the system control unit 15. The user viewing the still images 61 to 63 can rapidly grasp the condition of the whole body of ○○ teio 52 as entered horse at first view. In the present embodiment, the system control unit 37 in the user terminal 3-k is configured to display the Web page displaying a plurality of items of still image data associated with ○○ teio 52 in the window screen on the display of the display unit 32, but may display the plurality of items of still image data in the same Web page as the entered horse list (put in the entered horse list).

In the above embodiment, there is configured such that the Web page displaying the plurality of items of still image data extracted last (the plurality of items of still image data of the entered horses moving in the paddock before the race) is displayed as the display screen in the window screen. As another example, there may be configured such that when the acquisition of still image data of one horse is selected and operated, a Web page displaying last still image data close to a horse body posture of a sample image of the horse and past still image data (for example, extracted in the past) (still image data of a entered horse moving in the paddock before an already-ended race) close to the horse body posture of the same sample image together is displayed as the display screen in the window screen. In this case, the still image DB 142 stores therein the plurality of items of still image data extracted in the past, and the horse information DB 143 stores the plurality of items of still image data extracted in the past in association with the horse information such as horse name and with a predetermined file name. The HTML document is set the link to acquire and display the still image data extracted last and the still image data extracted in the past.

When the link is selected and operated (that is, the acquisition of still image data of a horse is selected and operated) by the operation unit 31 in the user terminal 3-$k$, the system control unit 15 generates Web page data to display a plurality of items of still image data extracted last and a plurality of items of still image data extracted in the past, and distributes it to the user terminal 3-$k$. Then, the system control unit 37 in the user terminal 3-$k$ displays the received Web page in the window screen on the display of the display unit 32. There will be described with reference to FIG. 10 an exemplary screen displayed in the window screen on the display of the display unit 32 which acquires the Web page data to display a plurality of items of still image data extracted last and the plurality of items of still image data extracted in the past.

FIG. 10 is a diagram showing an exemplary screen displayed in the window screen on the display of the display unit 32 which acquires the Web page data to display a plurality of items of still image data extracted last (such as the still image data extracted from the moving image data captured in the paddock before the race) and a plurality of items of still image data extracted in the past. As shown in FIG. 10, a window screen 70 displays therein still images 71 and 72 as the Web page displaying a plurality of items of still image data extracted in the past associated with ○○ teio 52, and a still image 73 as the Web page displaying a plurality of items of still image data extracted last associated with ○○ teio 52.

The still image 71 indicates a plurality of items of still image data of ○○ teio 52 moving in the paddock before the last race but one, and the still image 72 and the still image 73 indicate a plurality of items of still image data of ○○ teio 52 moving in the paddock before the previous race. The respective still images are stored as horse body postures close to the sample images S1 to SN per race, respectively. For example, by way of three exemplary still images of the still image 71, the first still image indicates a horse body posture close to the sample image S1, the second still image indicates a horse body posture close to the sample image S2, and the third still image indicates a horse body posture close to the sample image S3. For three still images of each of the still image 72 and the still image 73, the first still image indicates a horse body posture close to the sample image S1, the second still image indicates a horse body posture close to the sample image S2, and the third still image indicates a horse body posture close to the sample image S3. The still images close to the sample images are acquired and arranged, and are further displayed from the present to the past or from the past to the present so that a change in the entered horse can be decided in the same horse body posture over time.

In the above embodiment, there is configured such that a Web page displaying a plurality of items of still image data associated with one horse name is displayed in the window screen, but there may be configured such that when a plurality of horse names are selected, a Web page displaying a plurality of items of still image data associated with the selected respective horse names is displayed as the entered horse list indicating a user interface for enabling a plurality of horse names to be selected. In this case, when the acquisition of still image data of two or more from a plurality of entered horses is selected and operated by the operation unit 31 in the user terminal 3-$k$ in the Web page displaying, to the user terminal 3-$k$, the horse information for which the link to acquire and display the still image data of the horses entered in a predetermined race is set, the system control unit 15 generates Web page data to display a plurality of items of last still image data close to the horse body postures of the sample images of the two or more horses, and distributes it to the user terminal 3-$k$. For example, the Web page is provided with check boxes corresponding to the horse names and a button (exemplary user interface for enabling a plurality of horse names to be selected) for selecting the a plurality of horse names. When the horse name is selected with the check box and the button is pressed through the operation unit 31 in the user terminal 3-$k$, the system control unit 15 generates Web page data to display a plurality of items of still image data associated with the selected horse names, and distributes it to the user terminal 3-$k$. The system control unit 37 in the user terminal 3-$k$ displays the received Web page in the window screen on the display of the display unit 32.

There will be described with reference to FIG. 11 and FIG. 12 one example in which when a plurality of horse names are selected, a Web page displaying the plurality of items of still image data associated with the selected respective horse names is displayed. FIG. 11 is an exemplary screen displaying the entered horse list in which check boxes and a button for enabling a plurality of horse names to be selected are displayed. As shown in FIG. 11, a window screen 80 displays therein a button 81, and check boxes 82 to 84 corresponding to horse names.

The check box 82, the check box 83 and the check box 84 correspond to ○○ teio, ΔΔ star and xx tiger, respectively. FIG. 12 is a diagram showing an exemplary screen displaying a Web page in which the plurality of items of still image data associated with the selected respective horse names are displayed. In FIG. 11, when the check boxes 82 to 84 are selected and the button 81 is pressed by the operation unit 31 in the user terminal 3-$k$, the Web page displaying the plurality of items of still image data associated with the selected respective horse names is displayed in the window screen on the display of the display unit 32.

Figure 12:
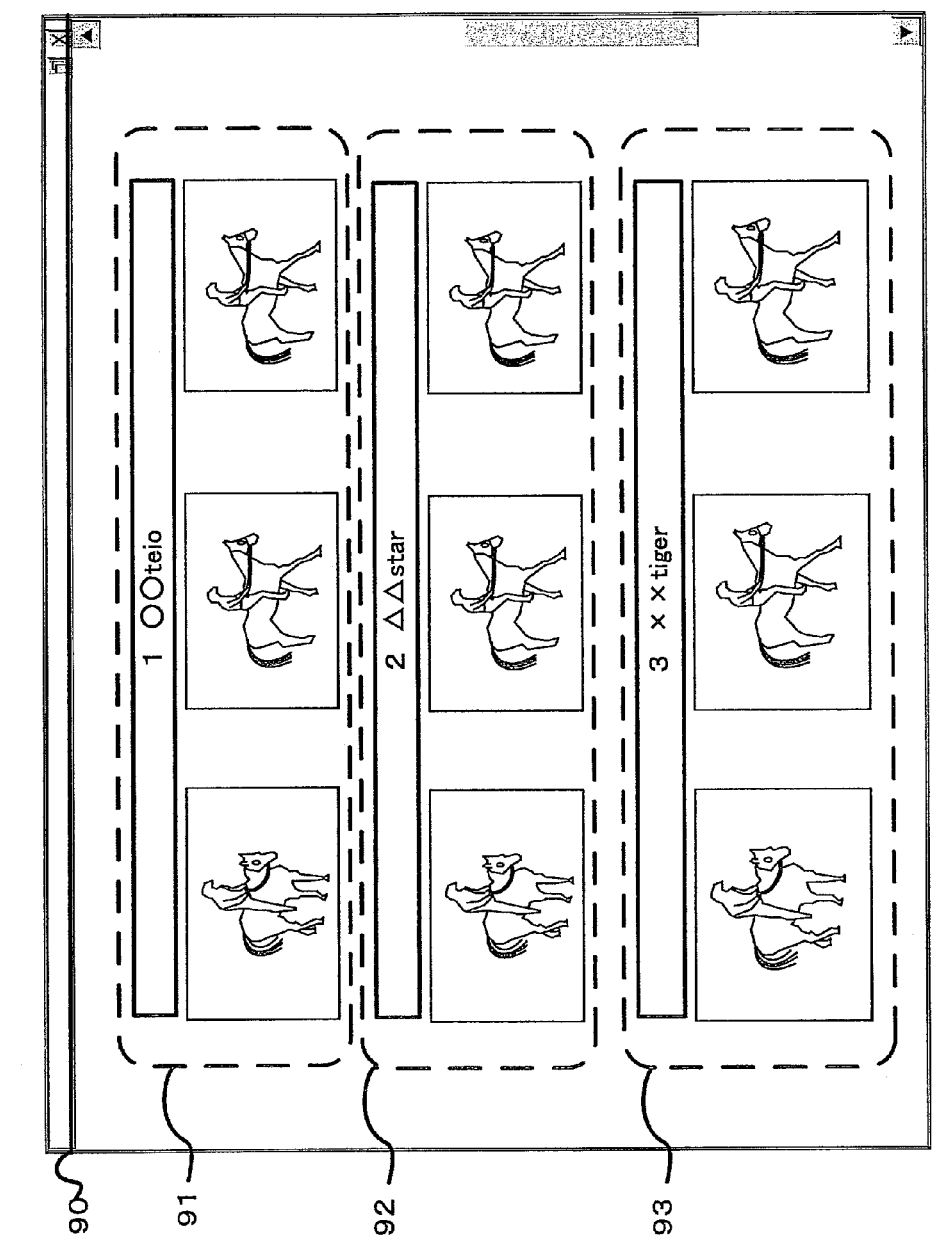
FIG. 12 is a diagram showing an exemplary screen displaying a Web page in which the plurality of items of still image data associated with the selected respective horse names are displayed.

As shown in FIG. 12, a window screen 90 displays therein a still image 91 as a Web page displaying a plurality of items of still image data associated with ○○ teio selected with the check box 82, a still image 92 as a Web page displaying a plurality of items of still image data associated with ΔΔ star selected with the check box 83, and a still image 93 as a Web page displaying a plurality of items of still image data associated with xx tiger selected with the check box 83. With the above structure, the user viewing the still images 91 to 93 can rapidly grasp the conditions of the whole bodies of the horses at first view.

As described above, according to the present embodiment, since the system control unit 15 acquires moving image data in which the entered horses moving in the paddock before the race are captured in the racetrack, extracts a plurality of items of still image data of the entered horses from the acquired moving image data, stores the a plurality of items of extracted still image data of the entered horses in association with the horse names, generates Web page data to display the plurality of items of still image data associated with the horse names when the horse names are selected as the entered horse list displaying the horse names for which the link to acquire and display the still image data by the user terminal 3-$k$ is set, and distributes it to the user terminal 3-$k$, the user viewing the display screen displaying the still image data can rapidly grasp the conditions of whole bodies of the horses at first view. The user can purchase a betting ticket by use of the user terminal 3-$k$ with reference to the still image data, thereby rapidly deciding a type of betting ticket to be purchased. The user can purchase the betting ticket in consideration of the conditions of the whole bodies of the entered horses immediately before the purchase deadline.

Since the system control unit 15 stores the horse names associated with still image data extracted last, and still image data extracted in the past of the horse names associated with the plurality of items of still image data extracted last, generates Web page data to display the plurality of items of still image data associated with the horse names when the horse names are selected and operated and the plurality of items of still image data extracted in the past as the entered horse list displaying the horse names for which the link to acquire and display the plurality of items of still image data extracted last and the plurality of items of still image data extracted in the past is set, and distributes it to the user terminal 3-k, the user can compare and grasp the present and past conditions of one entered horse and rapidly confirm the conditions of the entered horses.

Since the system control unit 15 displays the Web page displaying the plurality of items of still image data associated with selected respective horse names when the horse names are selected as the entered horse list in which the check boxes and the button for enabling the horse names to be selected are displayed, the user viewing the still images can rapidly grasp the conditions of the whole bodies of the entered horses at first view.

Since when receiving the input of starting to extract still image data, the system control unit 15 extracts the still image data from the moving image data based on the input, the user viewing the display screen displaying the still image data therein can be provided with the still images for enabling the conditions of the whole bodies of the entered horses to be compared and rapidly grasped at first view.

Since when receiving the input of starting to extract still image data, the system control unit 15 extracts the still image data periodically at a predetermined period of time, the system control unit 15 can extract plurality of items of still image data from the moving image data based on an operator's simple operation.

DESCRIPTION OF REFERENCE NUMERALS

1 INFORMATION PROVIDING SERVER
2 MANAGEMENT TERMINALS
2A CAMERA
2-1~2-3 TERMINALS
3-k USER TERMINALS
11,24,33 COMMUNICATION UNIT
12,22,32 DISPLAY UNIT
13,21,31 OPERATION UNIT
14,25,35 STORAGE UNIT
15,27,37 SYSTEM CONTROL UNIT
16,28,38 SYSTEM BUS
17,26,36 INPUT/OUTPUT INTERFACE UNIT
23 INTERFACE UNIT
34 DRIVE UNIT
NW NETWORK
U PADDOCK
V ENTERED HORSE

The invention claimed is:

1. A horse body information provision system comprising:
a moving image data storage device for storing moving image data of a horse entered in a race in association with horse information of the horse entered in the race;
a still image data extraction device for extracting still image data representing a horse body close to a horse body posture shown in a sample image from the moving image data stored in the moving image data storage device;
a still image data storage device for storing the extracted still image data in association with the horse information;
a generation device for generating Web page data to display the still image data associated with the horse information, in case where an operation for acquiring the still image data is selected in a Web page displaying the horse information for which a link to acquire and display the still image data is set on a terminal device; and a distribution device for distributing the generated Web page data to the terminal device.

2. The horse body information provision system according to claim 1, wherein
the still image data storage device stores still image data extracted last and still image data extracted in past, and
in case where an operation for acquiring still image data of one horse is selected in the Web page displaying the horse information for which the link to acquire and display the still image data extracted last and the still image data extracted in the past is set, the generation device generates Web page data to display the last still image data close to a horse body posture shown in sample image regarding the one horse and the past sill image data close to a horse body posture shown in the same sample image.

3. The horse body information provision system according to claim 1, wherein
the still image data storage device stores still image data of a plurality of horses entered in the race, and
in case where an operation for acquiring still image data of two or more horses out of the plurality of horses is selected in the Web page displaying the horse information for which the link to acquire and display the still image data of the plurality of horses is set, the generation device generates Web page data to display a plurality of last still image data close to a horse body posture shown in sample image regarding the two or more horses.

4. The horse body information provision system according to claim 1, wherein
the still image data extraction device comprises:
a display unit for displaying the moving image data;
a sample image acquisition unit for accepting an input of a horse body posture shown in a sample image of one horse while the moving image data is being displayed on the display unit; and
an extraction unit for extracting the still image data of the entered horse from the moving image data based on the accepted horse body posture of the sample image.

5. The horse body information provision system according to claim 4, wherein
after the sample image acquisition unit accepts the input of the horse body posture, the extraction unit extracts a horse body posture of a second sample image close to the horse body posture of the sample image at a predetermined period of time.

6. A horse body still image data extraction method for extracting still image data representing a horse body of a horse entered in a race from moving image data of the horse entered in the race, the method comprising:
a still image data extraction step for extracting still image data representing the horse body close to a horse body posture shown in a sample image from the moving image data;

a still image data storage step for storing the extracted still image data in association with a horse information of the horse entered in the race;

a generation step for generating Web page data to display the still image data associated with the horse information, in case where an operation for acquiring the still image data is selected in a Web page displaying the horse information for which a link to acquire and display the still image data is set on a terminal device; and a distribution step for distributing the generated Web page data to the terminal device.

7. A non-transitory computer-readable recording medium that stores a horse body still image data extraction program for extracting still image data representing a horse body of a horse entered in a race from moving image data of the horse entered in the race, the extraction program causing a computer to execute:

a still image data extraction step for extracting still image data representing the horse body close to a horse body posture shown in a sample image from the moving image data;

a still image data storage step for storing the extracted still image data in association with a horse information of the horse entered in the race;

a generation step for generating Web page data to display the still image data associated with the horse information, in case where an operation for acquiring the still image data is selected in a Web page displaying the horse information for which a link to acquire and display the still image data is set on a terminal device; and a distribution step for distributing the generated Web page data to the terminal device.

\* \* \* \* \*